(12) United States Patent
Saunamaki (10) Patent No.: US 10,361,565 B2
(45) Date of Patent: Jul. 23, 2019

(54) DETECTING RESONANT FREQUENCIES

(71) Applicant: Intel Corporation, Santa Clara, CA (US)

(72) Inventor: Esa Ilmari Saunamaki, Virrat (FI)

(73) Assignee: Intel Corporation, Santa Clara, CA (US)

( * ) Notice: Subject to any disclaimer, the term of this patent is extended or adjusted under 35 U.S.C. 154(b) by 788 days.

(21) Appl. No.: 14/865,456

(22) Filed: Sep. 25, 2015

(65) Prior Publication Data
US 2017/0093170 A1    Mar. 30, 2017

(51) Int. Cl.
*H02J 7/02* (2016.01)
*H02J 50/12* (2016.01)
*H02J 5/00* (2016.01)
*H02J 50/60* (2016.01)

(52) U.S. Cl.
CPC ............. *H02J 5/005* (2013.01); *H02J 7/025* (2013.01); *H02J 50/12* (2016.02); *H02J 50/60* (2016.02)

(58) Field of Classification Search
CPC .. H02J 50/12; H02J 50/40; H02J 50/50; H02J 50/60; H02J 50/80; H02J 50/90; H02J 50/07; H02J 5/005; H02J 5/00; H02J 17/00; H02J 7/025; H01Q 9/00; H01Q 9/04; G06F 1/26; G06F 1/28; H04L 25/08; G06K 19/0712; G01N 27/00; H04B 5/00
USPC ................ 307/104, 149, 66, 43, 82
See application file for complete search history.

(56) References Cited

U.S. PATENT DOCUMENTS

| | | | |
|---|---|---|---|
| 6,326,772 B2 * | 12/2001 | Kusumoto | H02M 3/155 307/109 |
| 8,427,101 B2 | 4/2013 | Saunamaki | |
| 8,655,272 B2 | 2/2014 | Saunamaki | |
| 9,941,753 B2 * | 4/2018 | Asanuma | H02J 50/90 |
| 2008/0211320 A1 * | 9/2008 | Cook | H01Q 7/005 307/149 |
| 2011/0057606 A1 | 3/2011 | Saunamaki | |
| 2013/0062959 A1 | 3/2013 | Lee et al. | |
| 2013/0062961 A1 | 3/2013 | Park et al. | |
| 2013/0241302 A1 * | 9/2013 | Miyamoto | H02J 50/12 307/104 |
| 2014/0015329 A1 | 1/2014 | Widmer et al. | |
| 2014/0015522 A1 * | 1/2014 | Widmer | G01D 5/2006 324/239 |
| 2014/0080409 A1 | 3/2014 | Frankland et al. | |

(Continued)

FOREIGN PATENT DOCUMENTS

| | | | | |
|---|---|---|---|---|
| WO | WO 2017086804 A1 * | 5/2017 | ............ | H02J 50/12 |
| WO | WO-2017086804 A1 * | 5/2017 | ............ | H02J 50/12 |

OTHER PUBLICATIONS

EP Search Report, EP Application No. 16185152, date of completion Feb. 8, 2017, 2 pages.

*Primary Examiner* — Fritz M Fleming
*Assistant Examiner* — Jagdeep S Dhillon
(74) *Attorney, Agent, or Firm* — International IP Law Group, P.L.L.C.

(57) ABSTRACT

Techniques for wirelessly transferring energy are described. An example device includes a transmitter coil to generate a magnetic field to wirelessly charge a battery. The device also includes a noise signal generator to generate a noise signal and send the noise signal to the transmitter coil. A frequency detection circuit is used to detect a resonance due to the noise signal and calculate a frequency of the resonance.

25 Claims, 7 Drawing Sheets

(56) References Cited

U.S. PATENT DOCUMENTS

| | | | |
|---|---|---|---|
| 2015/0109000 A1* | 4/2015 | Sieber | G01B 7/003 |
| | | | 324/655 |
| 2015/0180286 A1* | 6/2015 | Asanuma | G01B 7/003 |
| | | | 307/104 |
| 2015/0340902 A1 | 11/2015 | Luukkainen et al. | |
| 2016/0238731 A1* | 8/2016 | Chopra | H02J 7/0042 |

* cited by examiner

DETECTING RESONANT FREQUENCIES

TECHNICAL FIELD

This disclosure relates generally to techniques for wireless charging. Specifically, this disclosure relates to the detection of resonant circuits and structures near a wireless power transmission system.

BACKGROUND ART

A basic wireless charging system may include a wireless power transmitter unit (PTU) and a wireless power receiving unit (PRU). For example, a PTU may include a transmit (Tx) coil, and a PRU may include receive (Rx) coil. Magnetic resonance wireless charging may employ a magnetic coupling between the Tx coil and the Rx coil. In some cases, a PRU is implemented in a device having various size chassis. In some cases, PTU is configured as a constant current source even when various size chassis change a resonant frequency of magnetic coupling between the PRU and the PTU.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

The present disclosure relates generally to techniques for wireless charging. Specifically, the techniques described herein include an apparatus in a wireless power transmitting unit (PTU) having a transmitter (Tx) coil configured to generate a magnetic field. The apparatus may also include a tuning circuit for tuning the transmitter coil.

In some cases, it may be desirable for the PTU to appear as a constant current source. However, metal objects near the coil may have a tendency to detune the coil and thereby reduce the efficiency of the wireless energy transfer. For example, if a computing device with a relatively large metal chassis is placed on a wireless charging device, a reduction of the Tx coil inductance may occur as an eddy current induced on the metal chassis cancels part of the magnetic field generated by the Tx coil, causing the Tx coil to become detuned. Similarly, if the Tx coil is placed on a metal table, the metal table can also cause the Tx coil to become tuned. The detuning may be exhibited by a reactance shift from the desired resonant frequency. In some cases, the PTU may include tuning circuitry that can compensate for this reactance shift and retune the PTU to the desired resonant frequency.

The techniques described herein enable the resonant frequency of the PTU coil to be detected. The detection of the resonant frequency can serve as an indicator of how far out of tuning the PTU coil has drifted. Thus, the measured resonant frequency of the PTU coil can be used to control the tuning circuitry to retune the PTU coil.

In some examples, additional components of the PRU may also have a resonant frequency that can be detected, such as a Near-Field Communication (NFC) devices, another PTU unit, or other communication components. Detecting the presence of other resonant frequencies may trigger certain precautionary measures to prevent damage to circuitry, such as ensuring that the PTU does not transmit with full power if other resonant circuits are detected. Detecting the presence of other resonant frequencies may also trigger the PTU to transmit in a low power mode. In some examples, the detection of a shift in the PTU coil's resonant frequency can be used as an indication that a device has been placed over the PTU for charging. In some examples, the detection of an RF lossy circuit can be used as an indication that a device has been placed over the PTU for charging. The PTU may also retune the Tx coil out of the wireless power frequencies to ensure that resonance of the Tx coil not disturb detection of the second device.

The techniques discussed herein may be implemented using a wireless charging standard protocol, such as the specification provided by Alliance For Wireless Power (A4WP) version 1.3, Nov. 5, 2014. A wireless power receiving (Rx) coil may be a component in a power receiving unit (PRU), while a wireless power transmission (Tx) coil may be a component in a power transmitting unit (PTU), as discussed in more detail below. However, the techniques described herein may be implemented using any other wireless charging standard protocol where applicable.

Figure 1:
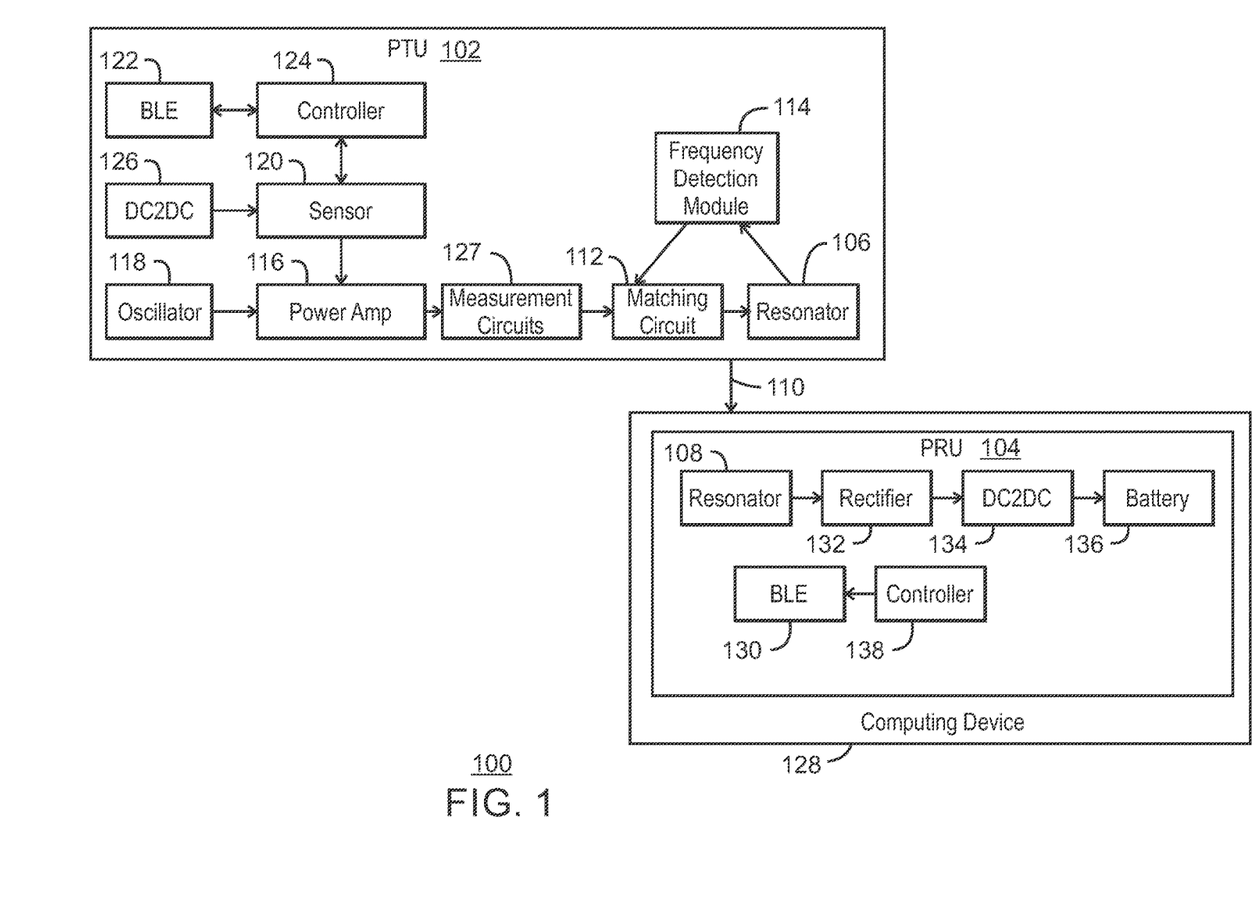
FIG. 1 is block diagram of a PTU to provide power to a PRU, wherein the PTU includes a resonant frequency detection circuit.

FIG. 1 is block diagram of a PTU to provide power to a PRU, wherein the PTU includes a resonant frequency detection circuit. A PTU 102 may coupled to a PRU 104 via magnetic inductive coupling between resonators 106 and 108, as indicated by the arrow 110. The PRU 104 may be a component of a device 128 configured to receive charge by the inductive coupling 110. The device 128 may any type of electrical device, including mobile phones, media players, small wearable devices such as watches, and others. The device 128 may also be a computing device such as a laptop, smart phone, or tablet. The resonator 106 may be referred to herein as a Tx coil 106 of the PTU 102. The resonator 108 may be referred to herein as an Rx coil 108 of the PRU 104.

The PTU 104 may include a matching circuit 112 configured to match the amplified oscillation provided to the resonator 106 of the PTU 102. The matching circuit 112 may include any suitable arrangement of electrical components such as capacitors, inductors, and other circuit elements that can be adjusted match the resonator 106 to the power amplifier 116. The operation of the matching circuit 112 can generate a reactance shift to compensate for detuning of the magnetic inductive coupling 110.

Other components of the PTU may include a power amplifier 116, and oscillator 118, a current sensor 120, a Bluetooth Low Energy (BLE) module 122, a controller 124, direct current to direct current (DC2DC) converter 126, and the like. The current sensor 120 may be an ampere meter, a volt meter, or any other sensor configured to sense load variations occurring due to inductive coupling between the PTU 102 and another object, such as the PRU 104. The current sensor 120 may provide an indication of load change to the controller 140 of the PTU 102. The controller 140 may power on the power amplifier 116 configured to receive direct current (DC) from the DC2DC converter 126, and to amplify and oscillate the current. The oscillator 118 may be configured to oscillate the power provided at a given frequency. In some examples, there may be one or more measurement circuits 127 located between the power amplifier and the measurement circuit. The measurement circuits can measure any electrical characteristics of the power amplifier output, including voltage and current.

As shown in FIG. 1, an inductive coupling 110 may occur between the Tx coil 106 and the Rx coil 108, and as a magnetic flux associated with the inductive coupling passes through the Rx coil 108 the computing device 111 may receive power. A rectifier 132 may receive voltage having an alternating current (AC) from the Rx coil 108 and may be configured to generate a rectified voltage (Vrect) having a direct current (DC). As illustrated in FIG. 1, a DC2DC converter 134 may provide a DC output to a battery 136.

The PRU 104 may also include a controller 138 configured to initiate a wireless broadcast having wireless handshake data. As discussed above, the wireless handshake broadcast may be carried out by a wireless data transmission component such as BLE module 130.

The PTU 102 also includes a frequency detection module 114 for detecting the resonant frequency of the resonator 106. The frequency detection module 114 measures the resonant frequency of the resonator 106. The resonant frequency information can then be used to control the matching circuit 112 to retune the resonator back to the desired resonant frequency. For example, the chassis of the device 128 may interact with the inductive coupling 110 via interference with the magnetic field flux generating the inductive coupling 110. This interference cause a shift in the resonant frequency of the resonator 106. The shift in the resonant frequency may be detected by the frequency detection module 114. Upon detection of the resonant frequency, the matching circuit 112 can be configured to return the magnetic inductive coupling 110 to the desired resonant frequency. In some examples, the PTU 102 can set the matching circuit 112 to a pre-defined setting that is known to provide suitable tuning under certain conditions. For example, there may be a pre-defined tuning setting that is known to be suitable for when the PTU 102 is sitting on a metal table. If the PTU 102 detects a resonance shift that indicates the presence of a metal table, the PTU 102 can set the matching circuit 112 to the pre-defined setting for when the PTU 102 is sitting on a metal table.

As explained further below, the frequency detection module 114 can include any suitable number and type of sensors, circuitry, processors, and the like. For example, the frequency detection module 114 can be an Analog to Digital Converter (ADC). Additionally, in some examples, the measurement circuits 127 may be used for detecting resonant frequencies of the resonator 106 by sweeping across a range of frequencies.

As described further below, the PTU 102 is configured detect the resonant frequency of the resonator 106 by transmitting a broadband noise signal through the resonator 106. When broadband noise is feed to the resonator 106, the resonance of the resonator 106 will cause the signals to be the amplified at the resonance frequency or frequencies. The resonant frequencies can be detected, for example, using a frequency counter circuit. The broadband noise signal can be created using a variety of techniques, for example, a comb generator, a random noise generator, a fast sweeping signal, or a noise diode. The frequency range of the broadband noise can be specified to cover mainly those frequencies that are known as being used in computing devices. In examples such as A4WP and NFC, the frequency range of the noise signal may be from approximately 5 to 15 MHz. In the case of a Qi/PMA based charger detecting it's own resonance and any possible NFC resonances, the frequency range may be about 100 kHz to 15 MHz.

The frequency detection module 114 may have capacitive or inductive coupling to the resonator 106. The frequency detection module 114 can also have a signal level measurement feature to detect resonance frequency in the case that resonance detection is based on a sweeping signal. The frequency detection module 114 may also include band pass or low pass filters to minimize interferences from other sources.

If an offset in resonance frequency is detected, the frequency detection circuit 114 can control the matching circuit 112 to retune the resonator 106. In some examples, the resonator tuning can occur while the broadband noise signal is active. In some examples, the broadband noise signal is switched OFF during resonator tuning and switched back on to repeat the resonant frequency detection to ensure that the matching circuit is correctly adjusted.

The block diagram of FIG. 1 is not intended to indicate that the PTU 102 and/or the PRU 104 are to include all of the components shown in FIG. 1. Further, the PTU 102 and/or the PRU 104 may include any number of additional components not shown in FIG. 1, depending on the details of the specific implementation.

Figure 2:
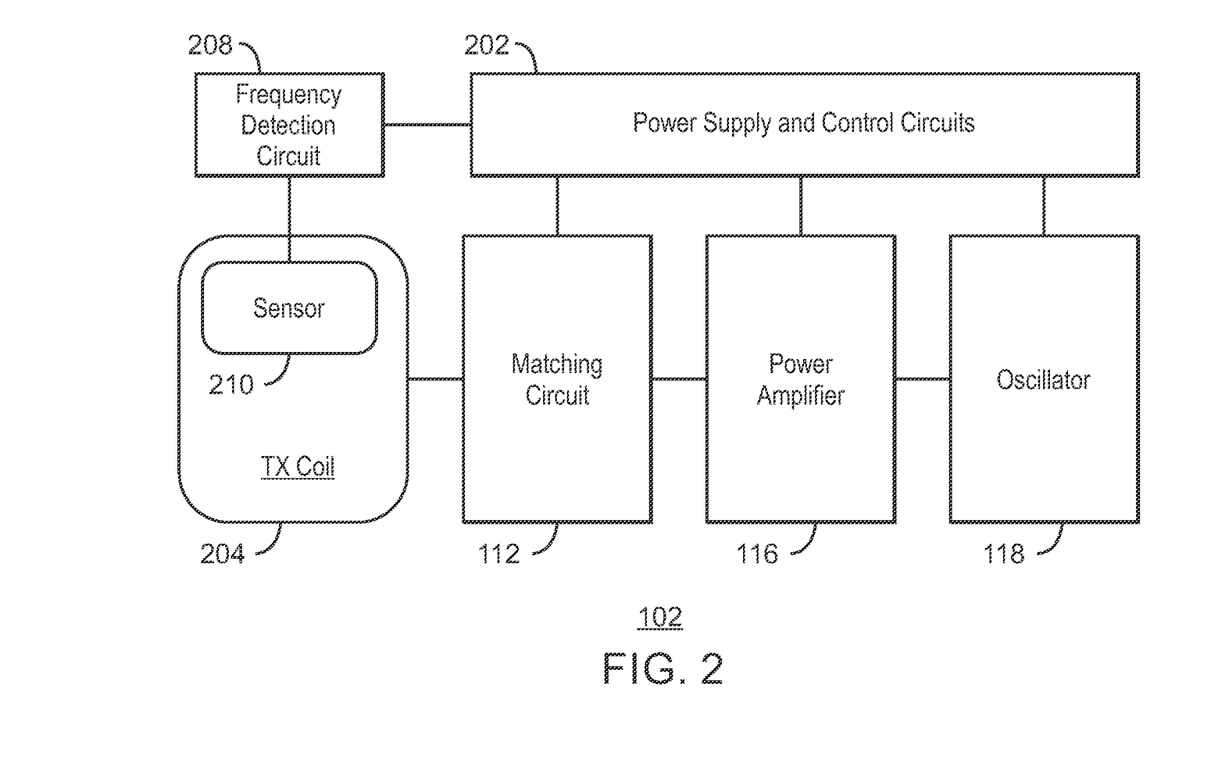
FIG. 2 is a block diagram of a PTU configured to detect the resonant frequency of the PTU's resonator.

FIG. 2 is a block diagram of a PTU configured to detect the resonant frequency of the PTU's resonator. The PTU 102 includes the matching circuit 112, the power amplifier 116, and the oscillator 118. As described above, the oscillator 118 generates the signal that is to be transmitted from the transmitter coil 204 for the purpose of wirelessly charging a battery or transferring energy to an electrical device. In the embodiment of FIG. 2, the oscillator 118 can also be used to generate the broadband noise or signal that is used for measuring the resonant frequency of the transmitter coil 204.

The PTU 102 also includes power supply and control circuits 202. The power supply and control circuits 202 can include the current sensor 120, Bluetooth Low Energy (BLE) module 122, controller 124, and direct current to direct current (DC2DC) converter 126 shown in FIG. 1.

In the embodiment shown in FIG. 2, the PTU resonator is a transmitter coil 204. However, the techniques described herein are applicable to other types of resonator. Resonant frequency detection is performed by a frequency detection circuit 208 which is coupled to a sensor 210. The sensor 210 may be a conductive coil, a conductive plate, or other type of conductor. The sensor 210 is capacitively or inductively coupled to the transmitter coil 204, and a proportion of the energy emitted by the transmitter coil 204 at each frequency will be received by the sensor 210.

The signal coupled by the sensor 210 is received from the sensor by the frequency detection circuit 208. In some examples, the frequency detection circuit 208 is a frequency counter, which will detect the frequency of the signal received from the sensor 210. If the sensor receives a signal with a mix of several frequencies, the frequency counter will generally return the frequency of the dominant signal, i.e., the signal with the largest magnitude, which will generally be the resonant frequency of transmitter coil 204. The frequency detected by the frequency detection circuit 208 can be sent to the power supply and control circuits 202 and used to adjust the matching circuit 112 to retune the transmitter coil 204.

In some examples, the frequency detection circuit 208 senses a signal magnitude for a range of frequencies and transmits this signal strength data to the power supply and control circuits 202 for further analysis. For example, the signal strength data can be used to detect the presence of two or more resonant frequencies that may exist across the range of frequencies. For example, the PTU may detect resonances of various electrical components that may be present in the device 128, such as Radio Frequency Identification (RFID) tags, Near-Field Communication (NFC) devices, and the like. Components such as NFC antennas may cause resonances at known frequencies. For example, many NFC circuits are configured to operate at 13.56 MegaHertz (MHz). Thus, if the PTU 102 detects a resonance at or near 13.56 MHz, the PTU 102 will be alerted that the device 128 includes an NFC circuit that is magnetically coupled to the transmitter coil 204. In response, the PTU 102 can disable the application of wireless power to the device 128 or reduce the magnitude of the transmitted signal. In this way, damage to the NFC circuitry can be avoided.

In some examples, the presence of a resonant frequency may be used as an identifier of a type of computing device, mobile device, or wearable device. For example, the devices 128 may be equipped with a resonant identification unit that can be configured to resonate at a specified frequency. Each resonant identification unit of a specific frequency can be associated with a different type of device 128, component, or capability. When the device 128 is placed on the PTU 102, the resonant frequency of the identification unit is detected and used to determine the type of device 128 or a component presence or capability of the device 128. The detection of the resonance may trigger the PTU 102 to activate wireless charging, increase or reduce the charging power, or issue a warning to the user. The detection of the resonance may also enable the PTU 102 to display information about the device 128 to the user.

In some cases, the frequency detection circuit 208 may receive an interference signal that is unrelated to the resonance of the transmitter coil 204. To prevent interference signals from affecting the results of the resonant frequency detection, a pulsed noise signal can be used. During the resonant frequency detection process, the pulsed noise signal will alternate between on periods and off periods. During the off period, any signals detected will be identified as interference signals. The characteristics of any detected interference signals can be identified and recorded. During the on period, the detected interference signals can be ignored. Any other signals detected during the on period when noise signal is active can be identified as real resonances. In some examples, an adjustable filter can be used to filter out the identified interference signals.

Figure 3:
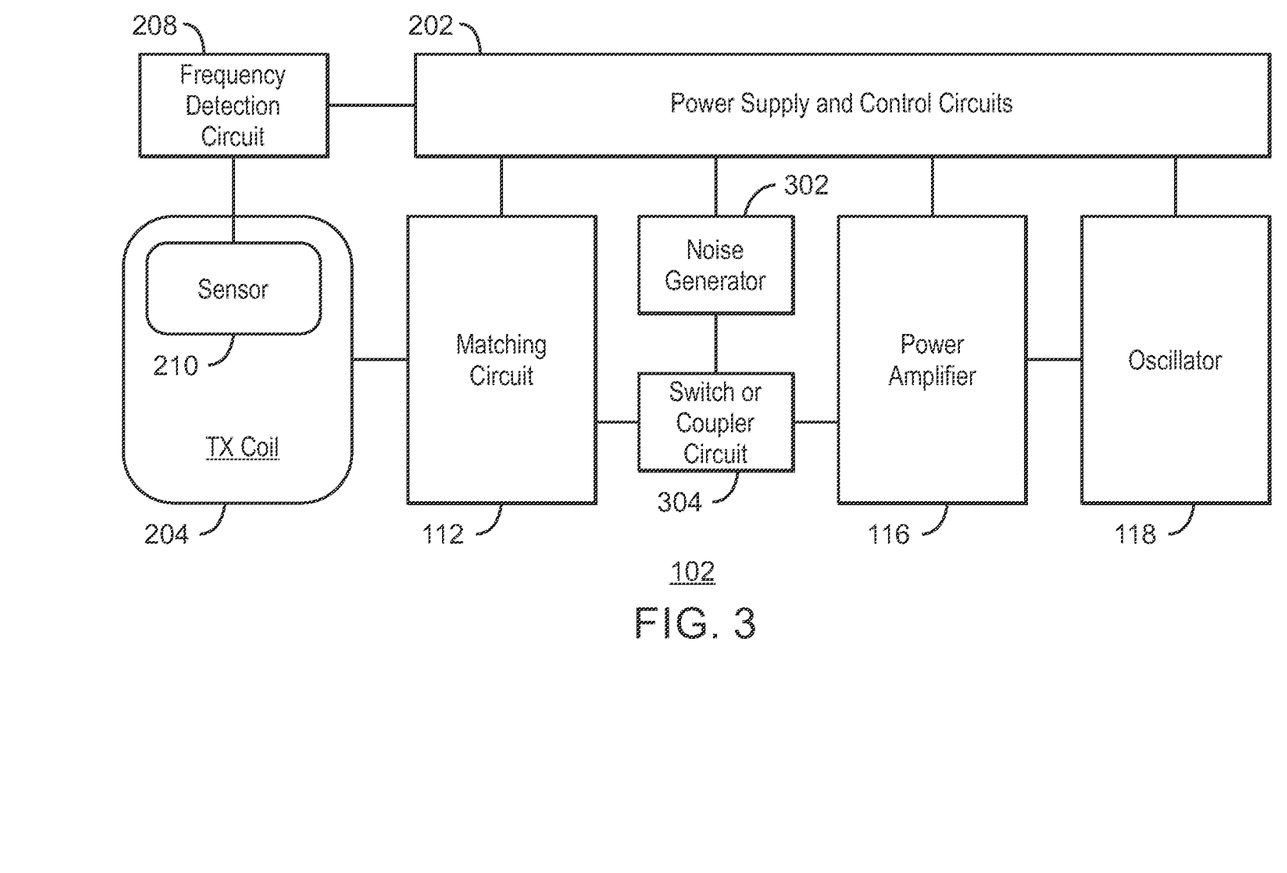
FIG. 3 is a block diagram of another PTU configured to detect the resonant frequency of the PTU's resonator.
Figure 4:
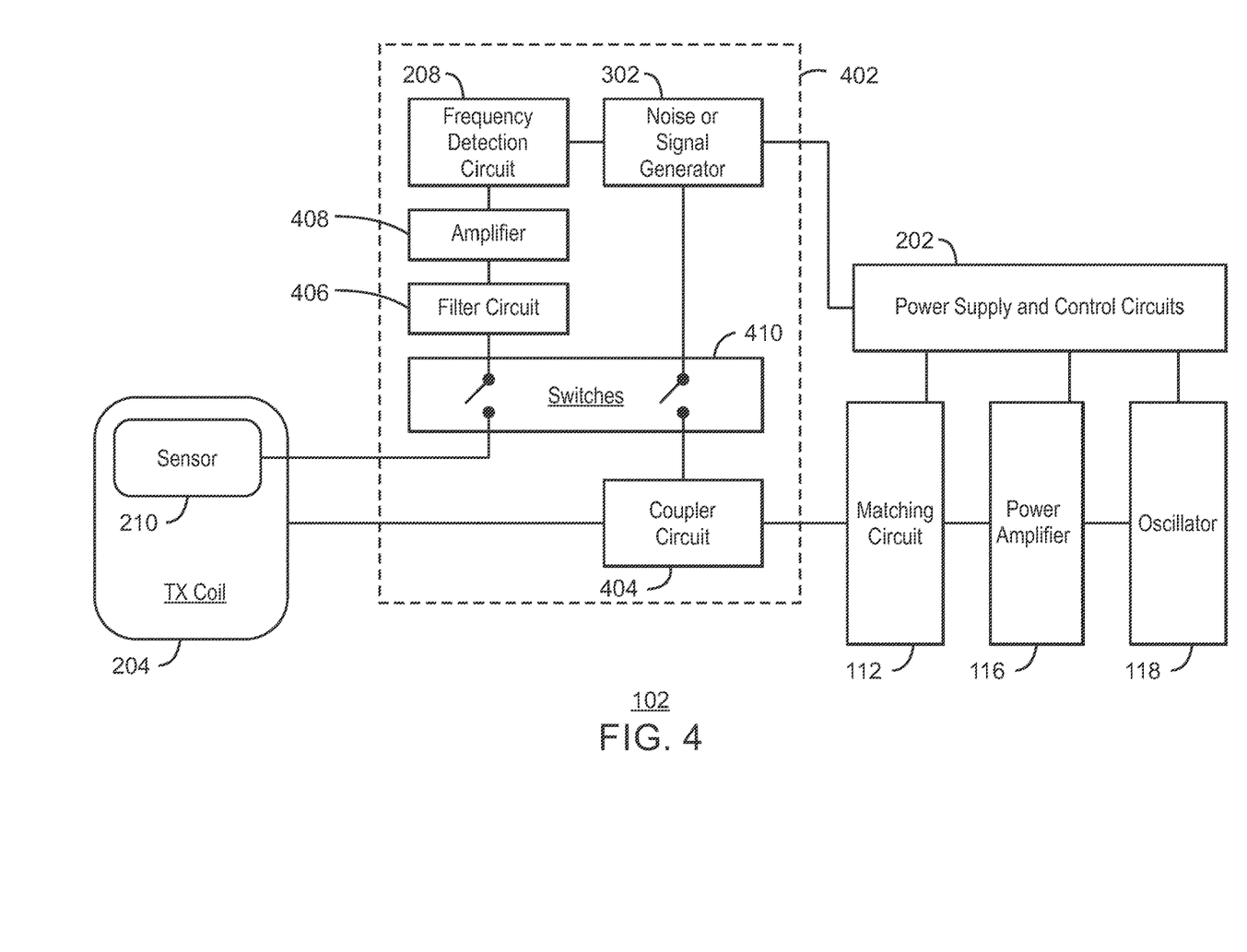
FIG. 4 is a block diagram of another PTU configured to detect the resonant frequency of the PTU's resonator.
Figure 5:
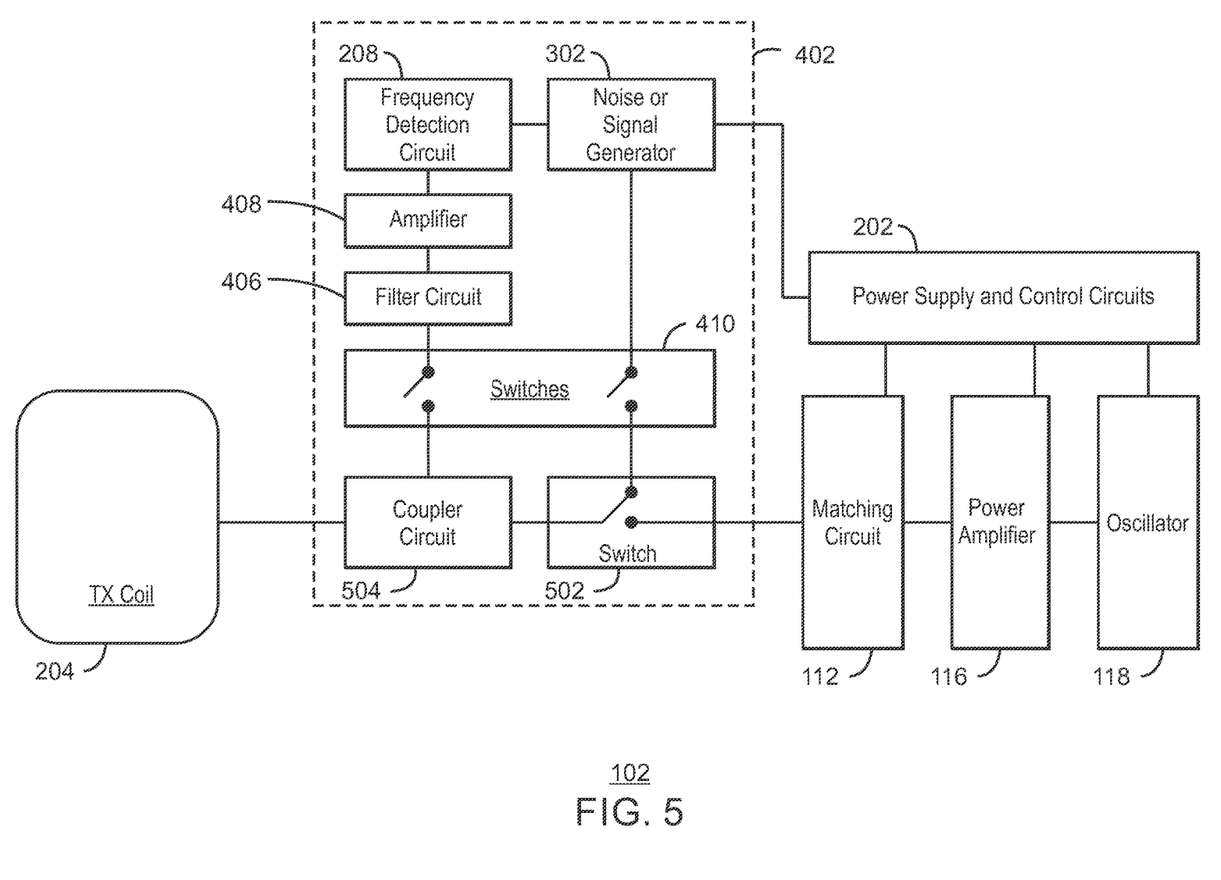
FIG. 5 is a block diagram of another PTU configured to detect the resonant frequency of the PTU's resonator.

The block diagram of FIG. 2 is not intended to indicate that the PTU 102 is to include all of the components shown in FIG. 1. Further, the PTU 102 may include any number of additional components not shown in FIG. 1, depending on the details of the specific implementation. Other possible configurations of the PTU 102 are shown in FIGS. 3-5. Various other configurations are also possible in addition to the configurations shown herein.

FIG. 3 is a block diagram of another PTU configured to detect the resonant frequency of the PTU's resonator. The PTU 102 shown in FIG. 3 is substantially the same as the PTU 102 shown in FIG. 2. However, in the PTU of FIG. 3, the oscillator 118 is not the component that generates the noise signal. Instead, the PTU includes a separate noise generator 302. The term noise generator can also be used to refer to the oscillator 118, in embodiments where the oscillator generates the noise signal. In the embodiment of FIG. 3, the oscillator 118 generates the signal that is used for wireless charging, and the noise generator generates the broadband noise signal used for detecting the resonant frequency of the transmitter coil 204 and other resonant frequencies. The PTU 102 shown in FIG. 2 can also include a switch or coupler circuit 304 that couples the noise generator 302 and/or the oscillator 118 to the transmitter coil 204 through the matching circuit.

FIG. 4 is a block diagram of another PTU configured to detect the resonant frequency of the PTU's resonator. The PTU 102 shown in FIG. 4 includes the power supply and control circuitry 202, matching circuit 112, power amplifier 116, and oscillator 118. However, in this example, the noise generator and frequency detection circuit are included in a separate frequency measurement system 402. In the example shown in FIG. 4, the noise signal is fed to the transmitter coil 204 through an RF coupler circuit 404. In some examples, the noise generator 302 uses a Digital to Analog Converter (DAC) to generate noise or other type of signal, and the frequency detection circuit 208 is an analog-to-digital converter that detects resonant frequencies using smart algorithms. A smart algorithm based system may detect serial or parallel resonances and use this information to recognize devices near the TX coil 204. Frequency detection may also use other radio frequency receiver systems to detect changes in the signal generated in noise/signal generation unit.

On the frequency or resonance detection side, the system 402 may use a filter circuit 406 and an amplifier 408 to improve system performance. The filter circuit 406 may include several switchable filter banks capable of filtering out selected frequency bands. If the PTU 102 uses a pulsed noise signal to identify interference signals, the filter circuit 406 can be tuned to block the identified interference signals. In some cases, the filter circuit 406 can be a band stop filter configured to block the wireless charging signal and enable the detection of other resonant frequencies such as NFC. The filter circuit 406 can be also a tunable, active filter circuit. The frequency measurement system 402 can also optionally include one or more switches 410 to ensure that the wireless charging signal is not able to cause damage to the frequency measurement system 402.

FIG. 5 is a block diagram of another PTU configured to detect the resonant frequency of the PTU's resonator. The PTU 102 shown in FIG. 5 is substantially the same as the PTU 102 shown in FIG. 4. However, the PTU of FIG. 5 does not use a separate sensor to detect resonant frequencies. Instead, the frequency detection circuit 208 detects resonance frequencies directly from the interface between the coil 204 and the matching circuit 112. The PTU 102 of FIG. 5 includes a switch 520 to alternatively couple the power supply circuitry or the noise or signal generator 302 to the Tx coil 204. The Tx coil 204 is coupled to the frequency detection circuit 208 through a coupler 504.

Figure 6:
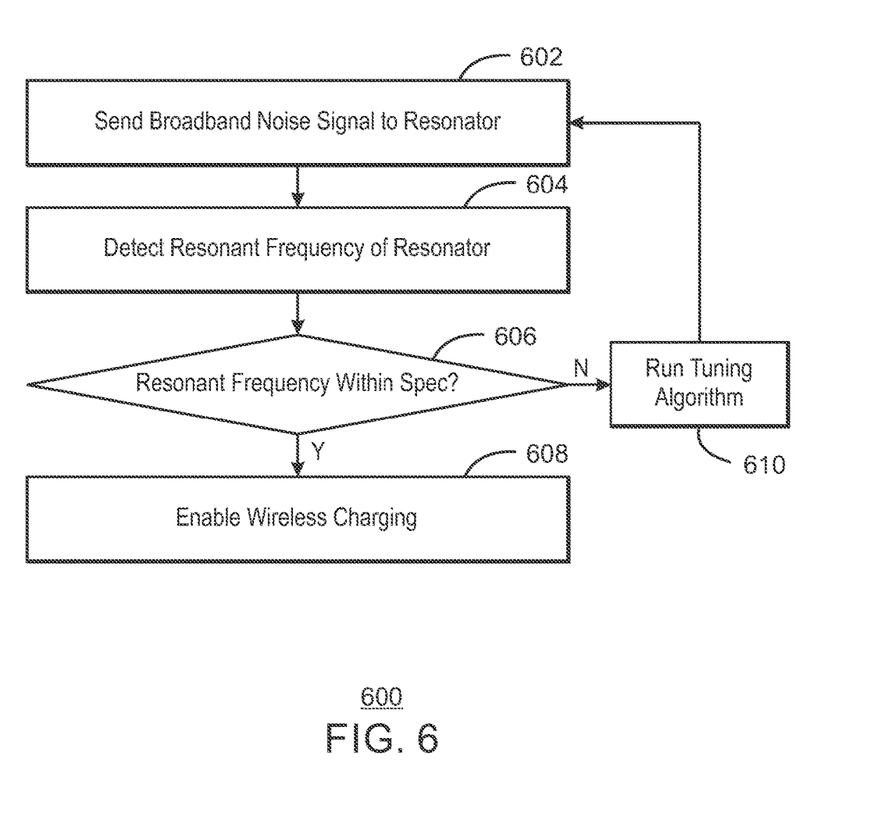
FIG. 6 is a process flow diagram of an example method for operating a wireless power transmitter.

FIG. 6 is a process flow diagram of an example method for operating a wireless power transmitter. The method 600 may be performed by the PTU 102 shown in any one of FIGS. 1-5 and implemented by logic included in the PTU 102. The logic may be embodied in hardware such as logic circuitry, a processor configured to execute instructions stored in a computer-readable medium, a special purpose processor such as Application Specific Integrated Circuit (ASIC) or Microcontroller, and other implementations.

At block 602, a broadband noise signal is delivered to the resonator. The resonator may be a conductive coil or other type of resonator. At block 604, the resonant frequency of the resonator is detected.

At block 606, a determination is made about whether the resonant frequency of the resonator is within specifications, in other words, at or near a target resonant frequency. The target resonant frequency is a frequency at which the resonator is considered to be tuned. Divergence between the measured resonant frequency and the target resonant frequency may result in inefficient power usage.

If the resonant frequency is within specifications, the process flow proceeds to block 608. At block 608, wireless charging is enabled. Accordingly, the noise signal can be switched off and the charging signal can be sent to the resonator. If the resonant frequency is not within specifications, the process flow proceeds to block 610. At block 610, a tuning algorithm is run. The tuning algorithm attempts to bring the resonant frequency of the resonator within specification by making adjustments to the matching circuit. For example, the tuning algorithm may activate or deactivate one or more tuning elements (e.g., capacitors or inductors) of the matching circuit. After the tuning algorithm has run and the matching circuit is adjusted, the process flow returns to block 602. In some examples, the method 600 may be periodically repeated to ensure that resonator stays within specifications over time.

The method 600 should not be interpreted as meaning that the blocks are necessarily performed in the order shown. Furthermore, fewer or greater actions can be included in the method 600 depending on the design considerations of a particular implementation.

Figure 7:
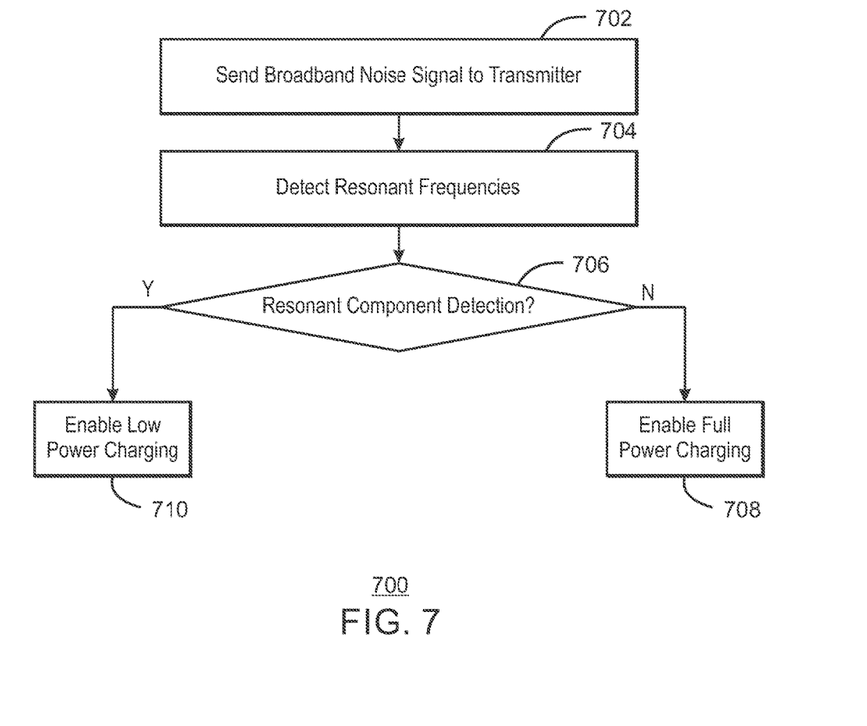
FIG. 7 is a process flow diagram of another example method for operating a wireless power transmitter.

FIG. 7 is a process flow diagram of another example method for operating a wireless power transmitter. The method 700 may be performed by the PTU 102 shown in any one of FIGS. 1-5 and implemented by logic included in the PTU 102. The logic may be embodied in hardware such as logic circuitry, a processor configured to execute instructions stored in a computer-readable medium, a special purpose processor such as Application Specific Integrated Circuit (ASIC) or Microcontroller, and other implementations.

At block 702, a broadband noise signal is delivered to the resonator. At block 704, resonant frequencies are detected. The resonant frequencies may include the resonant frequency of the resonator as well as other resonant frequencies, such as interference signals or resonances caused by components in the vicinity of the resonator.

At block 706, a determination is made about whether any resonant components have been detected. In some cases, the frequency of a resonance may be used as an indication of the type of component. One example of a resonant component that may be detected is an NFC device. NFC devices operate at 13.56 MHz. Therefore, a detection of a resonance at that frequency could indicate that an NFC device his in the vicinity of the resonator. Other types of components that can be detected in this way include RFID circuits, Bluetooth devices, and others.

If no resonant components have been detected, the process flow advances to block 608. At block 608, wireless charging is enabled at full power and the charging signal is sent to the resonator.

If a resonant component has been detected, the process flow advances to block 610. At block 610, low power wireless charging is enabled. The low power charging helps to ensure that the detected resonant component is not damaged by the field emitted by the resonator. In some examples, rather than low power charging, charging can be completely disabled. A warning message could also be sent to the user of the device regarding the detected component and/or that charging has been disabled or enabled at low power.

The method 700 should not be interpreted as meaning that the blocks are necessarily performed in the order shown. Furthermore, fewer or greater actions can be included in the method 700 depending on the design considerations of a particular implementation.

EXAMPLES

Example 1 is a device for wirelessly transferring energy. The device includes a transmitter coil to generate a magnetic field to wirelessly charge a battery; a noise signal generator to generate a noise signal and send the noise signal to the transmitter coil; and a frequency detection circuit to detect a resonance due to the noise signal and calculate a frequency of the resonance.

Example 2 includes the device of example 1, including or excluding optional features. In this example, the resonance is the resonance of the transmitter coil and the frequency is a resonant frequency of the transmitter coil. Optionally, the device includes a matching circuit to detune the transmitter coil before sending the noise signal to the transmitter coil. Optionally, the resonant frequency of the coil is used to calculate an adjustment of a matching circuit to impedance match the transmitter coil to a power amplifier.

Example 3 includes the device of any one of examples 1 to 2, including or excluding optional features. In this example, the device includes a controller to determine whether the frequency is a resonant frequency of a component in the vicinity of the transmitter coil. Optionally, the controller is configured to disable wireless charging if the frequency is a resonant frequency of a component in the vicinity of the transmitter coil. Optionally, the controller is configured to enable a low power charging mode if the frequency is a resonant frequency of a component in the vicinity of the transmitter coil. Optionally, the controller is configured to display a message to a user if the frequency is a resonant frequency of a component in the vicinity of the transmitter coil.

Example 4 includes the device of any one of examples 1 to 3, including or excluding optional features. In this example, the noise signal is configured to pulse between an on period and an off period and to identify interference sources during the off period. Optionally, the device includes an adjustable filter to filter out any identified noise sources.

Example 5 is a method of operating a wireless power transmitter. The method includes generating a noise signal and sending the noise signal to a transmitter coil; detecting a resonance caused by the noise signal and calculating a frequency of the resonance; and sending a charging signal to the transmitter to power an electrical device based on the frequency of the resonance.

Example 6 includes the method of example 5, including or excluding optional features. In this example, the resonance is the resonance of the transmitter coil and the frequency is a resonant frequency of the transmitter coil. Optionally, the method includes, if the resonant frequency is within a specified range, generating a charging signal and sending the charging signal to the transmitter coil. Optionally, the method includes, if the resonant frequency is outside of a specified range, calculating an adjustment of a matching circuit to impedance match the transmitter coil to a power amplifier.

Example 7 includes the method of any one of examples 5 to 6, including or excluding optional features. In this example, the method includes determining whether the frequency is a resonant frequency of a component in the vicinity of the transmitter coil. Optionally, the method includes, if the frequency is a resonant frequency of a component in the vicinity of the transmitter coil, disabling wireless charging. Optionally, the method includes, if the frequency is a resonant frequency of a component in the vicinity of the transmitter coil, enabling a low power charging mode. Optionally, the method includes, if the frequency is a resonant frequency of a component in the vicinity of the transmitter coil, displaying a message to a user.

Example 8 includes the method of any one of examples 5 to 7, including or excluding optional features. In this example, the method includes pulsing the noise signal between an on period and an off period and identifying interference sources during the off period. Optionally, the method includes adjusting a filter to filter out any identified noise sources.

Example 9 is a system for tuning in a wireless power transmitter. The system includes a transmitter coil configured to generate a magnetic field to wirelessly charge a battery; a matching circuit to impedance match the transmitter coil to a power amplifier; a noise signal generator to generate a noise signal and send the noise signal to the transmitter coil; a frequency detection circuit to detect a resonant frequency of the transmitter coil based on an electrical response to the noise signal; and a controller to adjust the matching circuit based on the resonant frequency.

Example 10 includes the system of example 9, including or excluding optional features. In this example, the controller is configured to detect additional resonant frequencies to identify additional resonant components in the vicinity of the transmitter coil. Optionally, the controller is configured to enable a low power charging mode if at least one of the additional resonant frequencies indicates a Near Field Communication (NFC) device is in the vicinity of the transmitter coil.

Example 11 includes the system of any one of examples 9 to 10, including or excluding optional features. In this example, the noise signal generator is configured to pulse the noise signal between an on period and an off period and interference sources are identified during the off period. Optionally, the system includes an adjustable filter to filter out any identified noise sources.

Example 12 is a system for operating a wireless power transmitter. The system includes a transmitter coil configured to generate a magnetic field to wirelessly charge a battery; a noise signal generator to generate a noise signal and send the noise signal to the transmitter coil; a frequency detection circuit to detect a resonant frequency based on an electrical response to the noise signal; and a controller to reduce the power sent to the transmitter coil if the frequency is a resonant frequency of a component in the vicinity of the transmitter coil.

Example 13 includes the system of example 12, including or excluding optional features. In this example, to reduce the power sent to the transmitter coil, the controller is to turn off the power to the transmitter coil to disable wireless charging.

Example 14 includes the system of any one of examples 12 to 13, including or excluding optional features. In this example, to reduce the power sent to the transmitter coil, the controller is to reduce the power to the transmitter coil below a threshold to enable a low power charging mode.

Example 15 includes the system of any one of examples 12 to 14, including or excluding optional features. In this example, the system includes a matching circuit to detune the transmitter coil before sending the noise signal to the transmitter coil.

Example 16 includes the system of any one of examples 12 to 15, including or excluding optional features. In this example, the noise signal generator is configured to pulse the noise signal between an on period and an off period and interference sources are identified during the off period.

Example 17 is an apparatus for delivering power wirelessly. The apparatus includes means for generating a noise signal and sending the noise signal to a transmitter coil; means for detecting a resonance caused by the noise signal and calculating a frequency of the resonance; and means for sending a charging signal to the transmitter to power an electrical device based on the frequency of the resonance.

Example 18 includes the apparatus of example 17, including or excluding optional features. In this example, the resonance is the resonance of the transmitter coil and the frequency is a resonant frequency of the transmitter coil. Optionally, the apparatus includes means for generating a charging signal and sending the charging signal to the transmitter coil if the resonant frequency is within a specified range. Optionally, the apparatus includes means for calculating an adjustment of a matching circuit to impedance match the transmitter coil to a power amplifier if the resonant frequency is outside of a specified range.

Example 19 includes the apparatus of any one of examples 17 to 18, including or excluding optional features. In this example, the apparatus includes means for determining whether the frequency is a resonant frequency of a component in the vicinity of the transmitter coil. Optionally, the apparatus includes means for disabling wireless charging if the frequency is a resonant frequency of a component in the vicinity of the transmitter coil. Optionally, the apparatus includes means for enabling a low power charging mode if the frequency is a resonant frequency of a component in the vicinity of the transmitter coil. Optionally, the apparatus includes means for displaying a message to a user if the frequency is a resonant frequency of a component in the vicinity of the transmitter coil.

Example 20 includes the apparatus of any one of examples 17 to 19, including or excluding optional features. In this example, the apparatus includes means for pulsing the noise signal between an on period and an off period and identifying interference sources during the off period. Optionally, the apparatus includes means for adjusting a filter to filter out any identified noise sources.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A device for wirelessly transferring energy, comprising:
   a transmitter coil to generate a magnetic field to wirelessly charge a battery;
   a noise signal generator to generate a noise signal and send the noise signal to the transmitter coil; and
   a frequency detection circuit to detect a resonance due to the noise signal and calculate a frequency of the resonance.

2. The device of claim 1, wherein the resonance is the resonance of the transmitter coil and the frequency is a resonant frequency of the transmitter coil.

3. The device of claim 2, further comprising a matching circuit to detune the transmitter coil before sending the noise signal to the transmitter coil.

4. The device of claim 2, wherein the resonant frequency of the coil is used to calculate an adjustment of a matching circuit to impedance match the transmitter coil to a power amplifier.

5. The device of claim 1, further comprising a controller to determine whether the frequency is a resonant frequency of a component in the vicinity of the transmitter coil.

6. The device of claim 5, wherein the controller is configured to disable wireless charging if the frequency is a resonant frequency of a component in the vicinity of the transmitter coil.

7. The device of claim 5, wherein the controller is configured to enable a low power charging mode if the frequency is a resonant frequency of a component in the vicinity of the transmitter coil.

8. The device of claim 5, wherein the controller is configured to display a message to a user if the frequency is a resonant frequency of a component in the vicinity of the transmitter coil.

9. The device of claim 1, wherein the noise signal is configured to pulse between an on period and an off period and to identify interference sources during the off period.

10. The device of claim 9, further comprising an adjustable filter to filter out any identified noise interference sources.

11. A method of operating a wireless power transmitter, comprising:
    generating a noise signal and sending the noise signal to a transmitter coil;
    detecting a resonance caused by the noise signal and calculating a frequency of the resonance; and
    sending a charging signal to the transmitter to power an electrical device based on the frequency of the resonance.

12. The method of claim 11, wherein the resonance is the resonance of the transmitter coil and the frequency is a resonant frequency of the transmitter coil.

13. The method of claim 12, comprising, if the resonant frequency is within a specified range, generating a charging signal and sending the charging signal to the transmitter coil.

14. The method of claim 12, comprising, if the resonant frequency is outside of a specified range, calculating an adjustment of a matching circuit to impedance match the transmitter coil to a power amplifier.

15. The method of claim 11, comprising determining whether the frequency is a resonant frequency of a component in the vicinity of the transmitter coil.

16. The method of claim 15, comprising, if the frequency is a resonant frequency of a component in the vicinity of the transmitter coil, disabling wireless charging.

17. The method of claim 15, comprising, if the frequency is a resonant frequency of a component in the vicinity of the transmitter coil, enabling a low power charging mode.

18. The method of claim 15, comprising, if the frequency is a resonant frequency of a component in the vicinity of the transmitter coil, displaying a message to a user.

19. The method of claim 11, comprising pulsing the noise signal between an on period and an off period and identifying interference sources during the off period.

20. The method of claim 19, comprising adjusting a filter to filter out any identified interference sources.

21. A system for tuning in a wireless power transmitter, comprising:
    a transmitter coil configured to generate a magnetic field to wirelessly charge a battery;
    a matching circuit to impedance match the transmitter coil to a power amplifier;
    a noise signal generator to generate a noise signal and send the noise signal to the transmitter coil;
    a frequency detection circuit to detect a resonant frequency of the transmitter coil based on an electrical response to the noise signal; and
    a controller to adjust the matching circuit based on the resonant frequency.

22. The system of claim 21, wherein the controller is configured to detect additional resonant frequencies to identify additional resonant components in the vicinity of the transmitter coil.

23. The system of claim 22, wherein the controller is configured to enable a low power charging mode if at least one of the additional resonant frequencies indicates a Near Field Communication (NFC) device is in the vicinity of the transmitter coil.

24. The system of claim 21, wherein the noise signal generator is configured to pulse the noise signal between an on period and an off period and interference sources are identified during the off period.

25. The system of claim 24, comprising an adjustable filter to filter out any identified interference sources.

* * * * *